US007857698B2

(12) United States Patent
Hein et al.

(10) Patent No.: US 7,857,698 B2
(45) Date of Patent: Dec. 28, 2010

(54) MULTIPLE PRIMARY GAMES FOR A GAMING DEVICE

(75) Inventors: Marvin A. Hein, Las Vegas, NV (US); Michael J. Mitchell, Las Vegas, NV (US); John R. Vallejo, Henderson, NV (US); David B. Schultz, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 272 days.

(21) Appl. No.: 11/428,220

(22) Filed: Jun. 30, 2006

(65) Prior Publication Data

US 2008/0004100 A1 Jan. 3, 2008

(51) Int. Cl.
*A63F 13/00* (2006.01)

(52) U.S. Cl. ............................ 463/25; 463/16; 463/20; 463/21; 463/43

(58) Field of Classification Search .................. 463/40, 463/16, 20, 21, 25, 43
See application file for complete search history.

(56) References Cited

U.S. PATENT DOCUMENTS 4,856,787 A 8/1989 Itkis
5,848,932 A * 12/1998 Adams ........................ 463/20
6,113,098 A * 9/2000 Adams ................... 273/143 R
6,162,121 A 12/2000 Morro et al.
6,569,015 B1 * 5/2003 Baerlocher et al. ............ 463/16
6,634,945 B2 * 10/2003 Glavich et al. ................ 463/25
6,652,378 B2 * 11/2003 Cannon et al. ................ 463/20
6,663,487 B1 * 12/2003 Ladner ........................ 463/13
6,663,488 B1 * 12/2003 Adams ........................ 463/17
6,860,810 B2 * 3/2005 Cannon et al. ................ 463/20
7,285,049 B1 * 10/2007 Luciano et al. ............... 463/42
7,452,269 B2 * 11/2008 Gauselmann ................ 463/16
2003/0212636 A1 * 11/2003 Resnick ........................ 705/42
2005/0075159 A1 * 4/2005 Kaminkow et al. ........... 463/16
2005/0124405 A1 6/2005 Nordman

FOREIGN PATENT DOCUMENTS

DE 19613455 8/1997
EP 1082979 3/2001
EP 1260928 11/2002
GB 2393020 3/2004
WO 2004022181 3/2004

* cited by examiner

*Primary Examiner*—Dmitry Suhol
*Assistant Examiner*—Sunit Pandya
(74) *Attorney, Agent, or Firm*—Steptoe & Johnson LLP

(57) ABSTRACT

A system and method for providing multiple randomly selectable primary games in a gaming device are disclosed. In one embodiment a gaming machine comprises a player input means and a central processing unit for receiving a trigger to activate game play. Additionally, the gaming machine comprises a selection means for selecting a primary game for game play. Also included are a first primary game presented on a first primary game display and a second primary game presented on a second primary game display.

26 Claims, 7 Drawing Sheets

MULTIPLE PRIMARY GAMES FOR A GAMING DEVICE

BACKGROUND

Various types of gaming machines have been developed with different features to captivate and maintain player interest. For example, gaming machines may include flashing displays, lighted displays, or sound effects to capture a player's interest in a gaming device.

Another important feature of maintaining player interest in a gaming machine includes providing the player with many opportunities to win awards, such as cash rewards or prizes. For example, in some slot machines, the display windows show more than one adjacent symbol on each reel, thereby allowing for multiple-row betting. Other types of slot machines have been developed that offer second-chance or bonus games that provide players with additional opportunities to win, such as with a bonus wheel. Furthermore, some gaming machines offer a player the opportunity to win millions of dollars by providing progressive jackpots. Additionally, other gaming machines include mystery-style bonus games that are used to entice and enhance player excitement.

While gaming machines including mystery-style and other bonus games have been very successful, there remains a need for gaming machines that provide a player with enhanced excitement and increased opportunity of winning.

BRIEF SUMMARY

Briefly, and in general terms, various embodiments are directed to a system and method for providing multiple selectable primary games in a gaming device. One embodiment is directed to a gaming machine comprising a player input means and a central processing unit for receiving a trigger to activate game play. Additionally, the gaming machine comprises a primary game selection means for selecting a primary game for game play. Also included are a first primary game presented on a first primary game display and a second primary game presented on a second primary game display.

Another embodiment is directed to a method for playing a game on a gaming machine having at least two distinct primary games. The method comprises receiving a wager from a player. After receiving the wager, the gaming machine determines which primary game to activate. The selected primary game is activated and a game outcome is presented to the player on a game display. A payout is awarded for the game outcome as appropriate.

DETAILED DESCRIPTION

Figure 1:
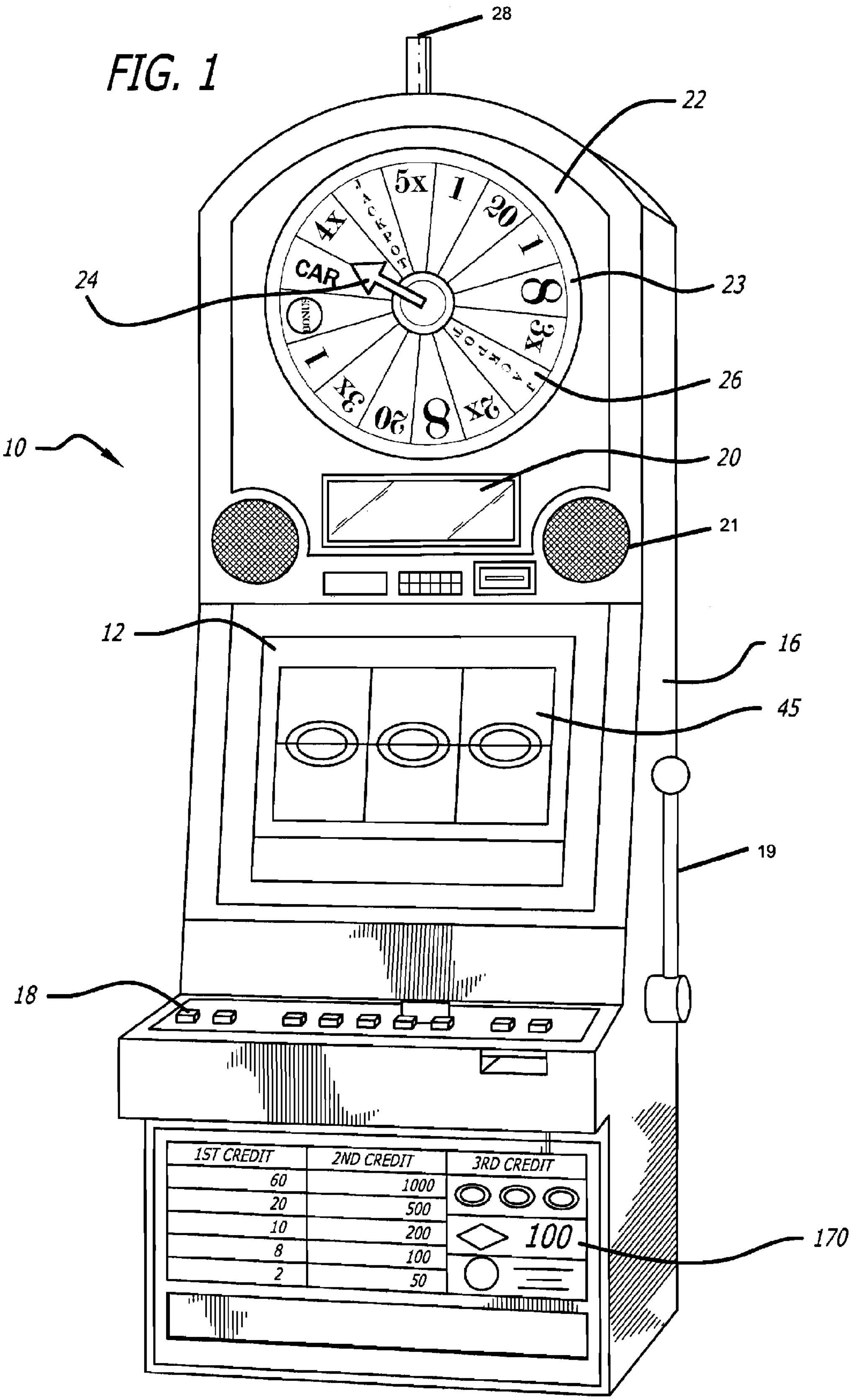
FIG. 1 illustrates an embodiment of a gaming machine comprising multiple primary games.

Various embodiments disclosed herein are directed to a system and method for providing multiple randomly selectable primary games in a gaming device. More particularly, the gaming devices offer multiple, distinct primary games, which are randomly selected and presented to a player upon the receipt of a player wager. Embodiments of the system, method and gaming device are illustrated and described herein by way of example only and not by way of limitation.

Referring now to the drawings, wherein like reference numerals denote like or corresponding parts throughout the drawings and, more particularly to FIGS. 1-8, there are shown various embodiments of systems and methods capable of providing multiple randomly selectable primary games in a gaming device.

Referring to FIG. 1, a gaming machine 10 having a first primary game display 12 and a second primary game display 22 is shown. The gaming machine 10 further includes a cabinet 16. The cabinet 16 is a self-standing unit that is generally rectangular in shape. In other embodiments, the cabinet (not shown) may be a slant-top, bar-top, or table-top style cabinet. However, any shaped cabinet may be used with any embodiment of the gaming machine 10 and sized for a player to be able to sit or stand while playing a game. Additionally, the cabinet 16 may be manufactured with reinforced steel or other rigid materials that are resistant to tampering and vandalism.

Cabinet 16 houses a game management unit (not shown) that includes a processor, circuitry, and software for receiving signals from the player-activated buttons 18 and a handle 19, operating the games, and transmitting signals to the respective displays and speakers 21.

The first primary game display 12 and the second primary game display 22 present one or more games of chance such as, but not limited to, mechanical slots, video slots, video poker, video blackjack, video keno, roulette, Class II bingo, craps, a mechanical wheel game or video representation of a wheel game. In alternate embodiments, it may further be appreciated that games of skill or games of chance involving some player skill may be presented in the first primary game display 12.

In one embodiment the second primary game display 22 presents a game of chance different from the game presented in the first primary game display 12. In an alternative embodiment, the second primary game display 22 presents the same game as the one displayed in the first primary game display 12.

Optionally, in one embodiment, the first primary game display 12 is a video display such as, but not limited to, CRTs (cathode ray tubes), or thin-panel displays. Examples of thin-panel displays include plasma, LCD (liquid crystal display), electroluminescent (EL), vacuum florescent, filled emission, or any other types of thin panel displays known or developed in the art. Additionally, the video picture may be presented in either a portrait or landscape orientation and utilize standard or widescreen dimensions. Optionally in an alternate embodiment, the second primary game display 22 is also a video display. In other embodiments, only one of the game displays 12 and 22 is a video display. Additionally, in another embodiment, at least one of the first primary game display 12 and the second primary game display 22 may also include a conventional touch-screen or touch-glass system (not shown).

Additionally, more than one game may be shown or played simultaneously, substantially simultaneously or sequentially, on one of the game displays 12, 22, such as four hands of blackjack. In one embodiment, second primary game display 22 presents a game of chance different from the game presented in or on first primary game display 12. In an alternative embodiment, second primary game display 22 presents the same game as the one displayed in first primary game display 12. In another embodiment, game displays 12, 22 are linked together for simultaneous or coordinated play of one or more games.

Referring again to FIG. 1, the gaming machine 10 includes a plurality of player-activated buttons 18. These buttons 18 may be used for various functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may be "pulled" by a player to initiate a game.

In optional embodiments, the buttons 18 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated by reference.

Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of pay lines to play in a game and the number of credits to bet per line.

Alternately, in an optional embodiment, the gaming machine 10 includes a video display 20 for presenting information such as, but not limited to, game related information, player information, advertisements and casino promotions, graphic displays, news and sports updates, or even offer another game. This information may be generated through a host computer networked with the gaming machine 10 on its own initiative or it may be obtained by request of the player using either one or more of the plurality of player-activated buttons 18, the video display itself if video display 20 comprises a touch screen or similar technology, buttons mounted about video display 20 (not shown) which may permit selections such as those found on an ATM machine where legends on the screen are associated with respective selecting buttons, or through use of the keypad shown beneath video display 20.

In one exemplary embodiment, the gaming machine 10 includes two distinct primary games, referred to as a first primary game and a second primary game which are operable together with the first primary game display 12 and the second primary game display 22, respectively. The first primary game is a reel game including one or more indicia-bearing reels and the second primary game is a wheel game.

In one exemplary embodiment, the gaming machine 10 includes two distinct primary games, referred to as a first primary game and a second primary game which are operable together with first primary game display 12 and second primary game display 22, respectively. The first primary game is a reel game including one or more indicia-bearing reels and the second primary game is a wheel game. A game selector is connected to the gaming circuitry and selects the game that will be played when a player initiates a game by making a wager and pressing the 'play' button (which may be one of the buttons 18 or may be some other player interface device such as an input device connected to video display 20) or pulls handle 19. In one embodiment, the games are randomly selected. Optionally, in another embodiment, a random number generator (RNG) may be used to select one of the multiple primary games offered on a gaming machine. The weighting of the RNG may be selected to statistically select the first primary game more often than the second primary game. By example, the RNG may be weighted to statistically select the second primary game, once in every thirty plays of the gaming machine 10. In one embodiment, the selection of primary games is independent of the play or gaming result of the other primary game and strictly driven by an RNG or some similar operation. In another embodiment, the selection of one of the primary games may be driven by an event on gaming machine 10, such as a win of an additional play of a selected game. Additionally, it may be appreciated by example that a counter may be used in place of an RNG to select the second primary game. For instance, when a game is played on the gaming machine 10, the first ten plays will be of the first primary game and the eleventh play will be of the second primary game. This sequence may run continuously independent of the player such that a gaming machine counter automatically triggers the selection of the game played. Alternatively, the gaming machine counter can reset to zero or one each time a new player begins play.

Referring back to FIG. 1, a reel game is presented on the first primary game display 12 and includes three mechanical spinning reels 45. In alternate embodiments, those skilled in the art will appreciate that any number of spinning reels may be used. The mechanical reel game presented in the first primary game display 12 is a game of chance wherein a player receives one or more outcomes from a set of potential outcomes indicated by award schedule 70. Each reel is designed to rotate and then stop in order to display at least one, and preferably, a number of indicia. If the combination of indicia displayed by the reels is one of the predetermined plurality of winning indicia sets, then the player is provided with a winning payout either through a coin dispenser or by increasing the player's credits in a credit window.

As shown in FIG. 1, the second primary game display 22 presents a wheel game comprising a wheel 23 and pointer 24. Wheel 23 is a fixed illustration of a wheel that includes payout indicators 26 on the face thereof. Various values are identified on the payout indictors, e.g., "1000", "250", "60", "125", etc. A pointer 24 is located in proximity to the wheel 23 so as to rotate about the illustration of the wheel 23. During play of the secondary game, the pointer 24 moves in a circular motion around the stationary wheel 23 and eventually comes to a stop in front of a payout indicator 26, thereby indicating a payout on the wheel 23 which the player has won. Alternatively, the pointer 24 is fixed and the wheel 23 spins.

Conventionally, payout indicator 26 is identified by gaming software operating on or in conjunction with gaming machine 10 through a random generator, such as a random number generator. The random generator assists in avoiding potential defective mechanical components that may drive an unlikely number of wins or losses. Prior to identifying payout indicator 26, the rate of speed of the spinning portion is adjusted to slow down to give an illusion of a free spinning device in order to build excitement and enjoyment of the player as the moment of selection builds.

In another embodiment, a second primary game display 22 comprises a wheel game having an illuminated physical pointer 24. Additionally, lights are placed about the axis of the wheel 23 (not shown). In this and other similar embodiments, the lights are selectively turned on and off until a selected payout indicator 26 is illuminated to identify the winning selection. The lights may be conventionally controlled by circuitry tied to the gaming machine processor and software. The lights may sequentially turn on and off to give the illusion of spinning or may randomly turn on and off until the selection is made in accordance with a conventional random number generator (not shown). Additionally, the lights may include a pointer light that is a different color from the other lights. By example, the lights may be blue and the pointer light may be red. The blue lights may remain on while the red light (which may be comprised of several consecutive lights) may be sequentially turned on and off to give the illusion of a spinning red light which ultimately will stop adjacent to the selected payout indicator 26. It may further be appreciated that the lights may comprise light emitting diodes (LEDs) with red-green-blue or similar coloring which came be activated according to an algorithm or pattern to cause particular visual affects that generate excitement or entertainment to a player.

Depending upon the occurrence of a winning outcome, the lights on the gaming machine 10 may begin flashing dramatically, a horn or other sounds may be emitted through the speakers 21, and a light 28 may be flashed in order to develop a sense of fanfare around a winning player and to alert casino floor personnel that a large win has occurred so that they may congratulate the winner, notify the winner of the payout, pay the winner, and/or reset gaming machine 10. Also, gaming machine 10 may be conventionally linked through a network to a host computer to provide notification to the casino of the win. Depending upon the casino management system, payouts on large wins at gaming machine 10 may be made directly to a player account managed by the host computer; in which case, the player is notified at gaming machine 10 that the player's account has been credited.

Optionally, in an alternate embodiment, the wheel game in the second primary game display 22 is a stationary wheel face 22 having multiple wheel segments 26 wherein separate prize amounts are indicated on each wheel segment 26. The pointer 24 rotates or moves in a circular motion around the stationary wheel face 22 and stops on a wheel segment 26 to indicate the winning outcome.

Figure 2:
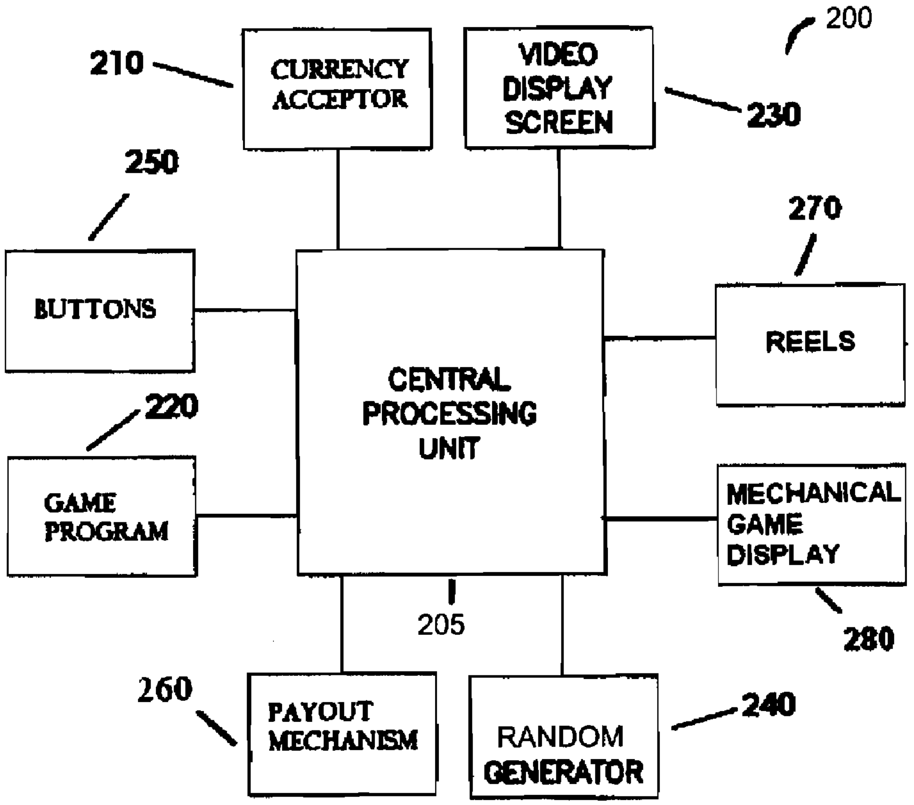
FIG. 2 is a block diagram of system components for operating an embodiment of a gaming machine comprising multiple primary games.

Referring now to FIG. 2, the block diagram 200 illustrates example system components for operating an embodiment of a gaming machine 10 comprising multiple primary games. Typically, game play is activated upon the receipt of a player wager or bet. A player may place a wager by inserting or entering a form of currency such as, but not limited to, paper currency, coins or tokens, cashless tickets or vouchers, electronic funds transfers, credits or the like into the game machine. The player then enters his wager amount. Upon receiving the player's wager, the game currency acceptor 210 signals the central processing unit ("CPU") 205.

The CPU 205 then instructs a random generator 240 to randomly select a primary game to be played. Generally, the gaming machine 10 offers at least two distinct primary games for play. In one embodiment, the random generator 240 is a random number generator. In one embodiment, the random selection of the primary game is evenly weighted. For example, in a gaming device offering two distinct primary games, both games may be played, 10 times out of 20, on average. Optionally, the random selection may not be evenly weighted. For example, one primary game may be played 17 times out of 20, and the other game 3 out of 20, on average.

Referring back to FIG. 2, once the random generator 240 selects a primary game, the CPU 205 executes a game program 220 that activates the play of a game in either the first primary game display 12 or in the second primary game display 22. The random generator 240 responds to instructions from the CPU 205 to provide a randomly selected outcome for each game. The CPU 205 then stops the selected game according to the outcome and a payout is awarded to the player as appropriate. In an optional embodiment, the outcome is evaluated, and then a payout is award as appropriate. In some embodiments, predetermined payout amounts for certain game outcomes are stored as part of game program 220. Such payout amounts are, in response to instructions from the CPU 205, provided to the player in the form of coins or credits by the payout mechanism 260.

In various embodiments of the gaming machine 10, the game program 220 is stored in a memory device (not shown). By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the gaming machine 10 are stored in a memory device (not shown).

Referring back to FIG. 1, the first primary game is implemented on gaming machine 10 using three mechanical spinning reels 45. A pay line (not shown) passes through one indicium on each of the reels 45. The player selects the number of credits or coins wagered on the pay line using buttons 18. It will be apparent that any number of pay line patterns may be made available for play. The player may also collect the balance of his credits by pressing a CASH OUT button (not shown).

A credit meter (not shown) displays the player's current credit balance, while other meters may display the total bet size and the last amount paid by the payout mechanism. The player initiates game play by depressing a SPIN button 30 or by operating (e.g., pulling) the handle 35. Alternately, the player may simultaneously select the maximum number of coins or credits allowed and initiate the game by pressing a MAX BET button 38.

If the random generator 240 selects the first primary game, mechanical reels 45 are made to spin and subsequently stop in their predetermined stop positions (note: the stop positions were randomly predetermined before the start of the game), and a determination is then made whether the stop positions of the reels results in a winning game outcome. Winning outcomes are indicated on a pay table 70. In alternate embodiments, the pay table may be presented on a video display. On a video machine, the pay table representation of a win event is often placed on a second display or on a multi-page help screen accessible through a HELP or PAY TABLE button (not shown).

A winning combination, for example, could be three or more "BAR" symbols adjacent to one another on the pay line. For each winning combination, the player may typically receive the award identified in the pay table. The award, however, may be adjusted as necessary based on the number of credits wagered on the pay line or on the game. In other words, the amount of the prize awarded may be based on the amount wagered. Optionally, in alternate embodiments, the number of coins in determines what prize a player is eligible to win. In other embodiments, video representations of pay tables factor in the amount of the player's wager and no additional award adjustment is required.

In one embodiment, the funding of each of the primary games is based on the wagers placed for each primary game. Optionally, in another embodiment, the prize may be funded based on "coin-out", as disclosed in U.S. application Ser. No. 11/212,533, entitled "COIN-OUT GAMING REWARD SYSTEM," filed on Aug. 25, 2005, which is hereby incorporated by reference. Alternatively, the primary games may be funded based on non-gaming revenues (e.g., promotional dollars).

In various embodiments, winning combinations may be evaluated across adjacent reels from left-to-right, from right-to-left or both. Additional winning combinations may be awarded when certain indicia do not necessarily accumulate adjacently on the pay line, but rather, appear anywhere on the reels (i.e., "scatter pays"). In addition, "wild" symbols may contribute to winning combinations.

If the random generator 240 selects the second primary game, reels 45 do not spin. Instead, the pointer 24 on the second primary game display 22 begins to rotate. The pointer 24 may be configured to rotate in a clockwise, counter-clockwise or random fashion before being brought to a stop adjacent to a win amount. For example, referring to FIG. 1, the pointer 24 is stopped at 150 credits. Additionally, the pointer 24 may be brought to an abrupt stop or may gradually slow down before stopping in order to create a sense of anticipation for the player.

Figure 3:
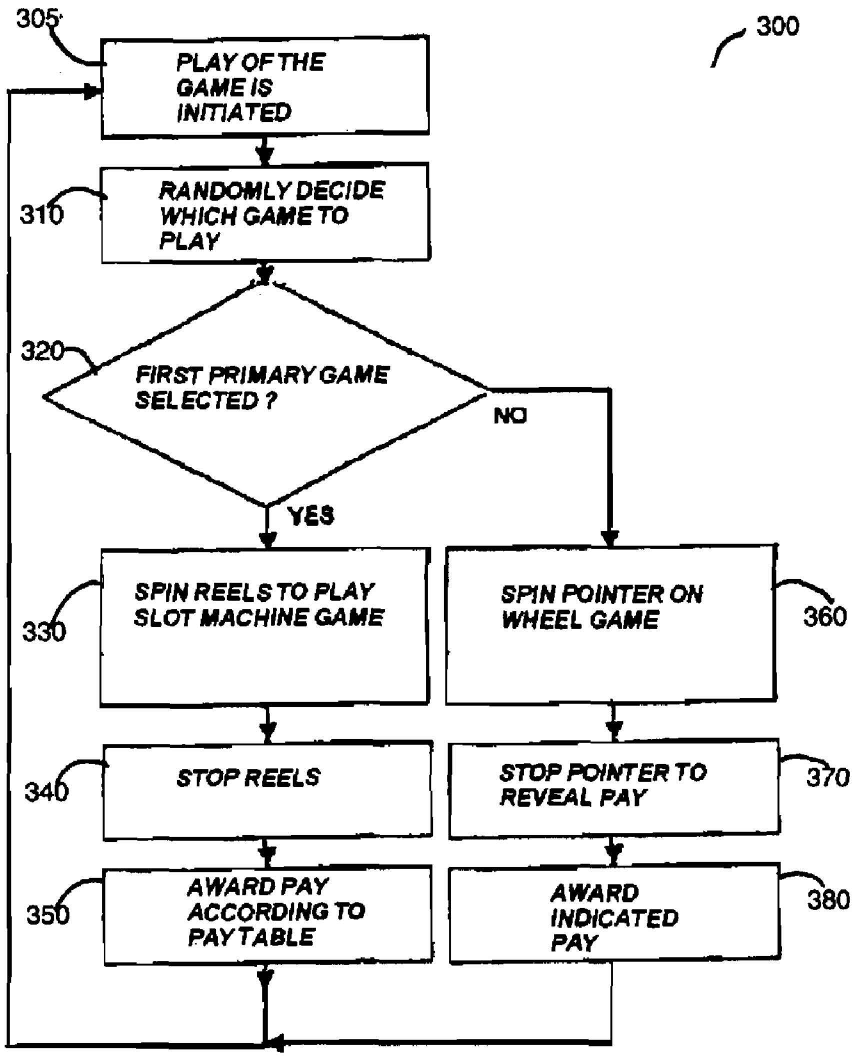
FIG. 3 is a functional block diagram illustrating a method for providing multiple randomly selectable primary games in a gaming device.

FIG. 3 is a functional block diagram 300 illustrating a method for dynamically determining a mechanical primary game display presentation. The order of actions as shown in FIG. 3 and described below is only illustrative, and should not be considered limiting. First, at step 305, the game is initiated on the gaming machine 10 of FIG. 1. For example, a player initiates game play by inserting currency of some form, selecting the denomination and quantity of a wager (which may include selecting a number of lines to play and selecting a number of credits to bet per line), and activating a start button or mechanism. Once game play is activated, a primary game is then randomly selected in step 310 to be presented to the player. In one embodiment, a random generator is used to make the random selection. Optionally, other mechanisms may be used to carry out the random selection process.

In one example embodiment, the gaming device includes two primary games. However, the gaming device may include any number of primary games and is not limited to two games. In this example, the first primary game is a slot machine game and the second primary game is a wheel game. Referring back to FIG. 3, if at step 320, the first primary game is NOT selected, the second primary game (e.g. the wheel game) is activated in step 360 and the pointer 24 rotates or moves in a circular motion around the wheel 23. In step 370, the pointer 24 stops to reveal a payout and, in step 380, an award is indicated, and thereafter paid out as appropriate.

Referring back to step 320, if the first primary game IS selected, then the process proceeds to step 330 and the reels 45 on the slot machine primary game spin. Next, in step 340, the reels 45 stop and in step 350 a payout is awarded according to the pay table.

Figure 4:
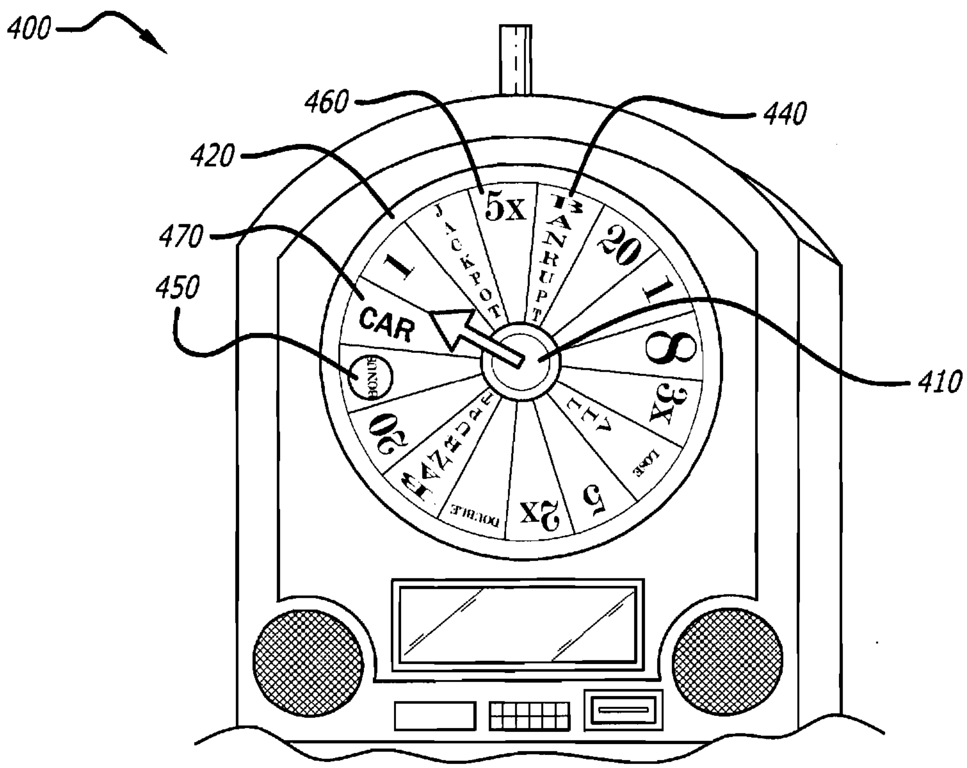
FIG. 4 illustrates an embodiment of a mechanical wheel primary game display having various types of indicia.

In one embodiment, the second primary game is a wheel game and the indicia displayed on the wheel are numerals representing amounts in credits, coins or some other representation of value. However, other kinds of indicia may also be displayed on the wheel. Referring now to FIG. 4, an alternative wheel 400 is illustrated. The indicia on the wheel face 420 of primary game display 400 may include any type or combination of indicia such as multipliers 460 (e.g., 2×, 5×, 10×), symbols 450 (slot machine indicia such as fruit, card faces or the like) or words 440 (JACKPOT, DOUBLE, RESPIN) or representations of non-monetary prizes (CAR, BOAT, FOOD). The indicia may be used individually or in combination to convey game results to the player. For example, in one embodiment, rotating pointer 410 spins two times, indicating first a "20", then a "RESPIN." The display of a RESPIN result causes rotating pointer 410 to move a third time, for example, to a "10×" indication. The entire sequence, therefore, would indicate a game outcome of 200 (20 times 10), coins or credits. In some embodiments, the award indicated by the primary game display may be adjusted as necessary based on the number of credits wagered on the game. It should be appreciated that the above examples of mapping a possible game outcome to a display presentation are intended to be illustrative and should not be construed as limiting in any way.

Other methods may be used to provide an entertaining presentation of a numeric win amount. For example, one entertaining presentation mechanism is disclosed in U.S. provisional Application Ser. No. 60/727,400 entitled "EXPANDED PRIMARY PAYOUT INDICATOR FOR A GAMING DEVICE," filed on Oct. 17, 2005, which is hereby incorporated by reference. In one embodiment, once the game results have been evaluated and a total win amount is known, the gaming machine may employ an algorithm that dynamically calculates one or more display pointer presentations that will, when presented, accumulate a total equal to the win amount. For example, if a primary game display has potential pay values of 1, 2, 4, 8, 10, 20, 100 and 2×, it would be possible for such an algorithm to show a pay of 100 using a single 100 presentation, a sequence of 20-8-2-10-2×-20, or any other combination totaling 100.

Figure 5:
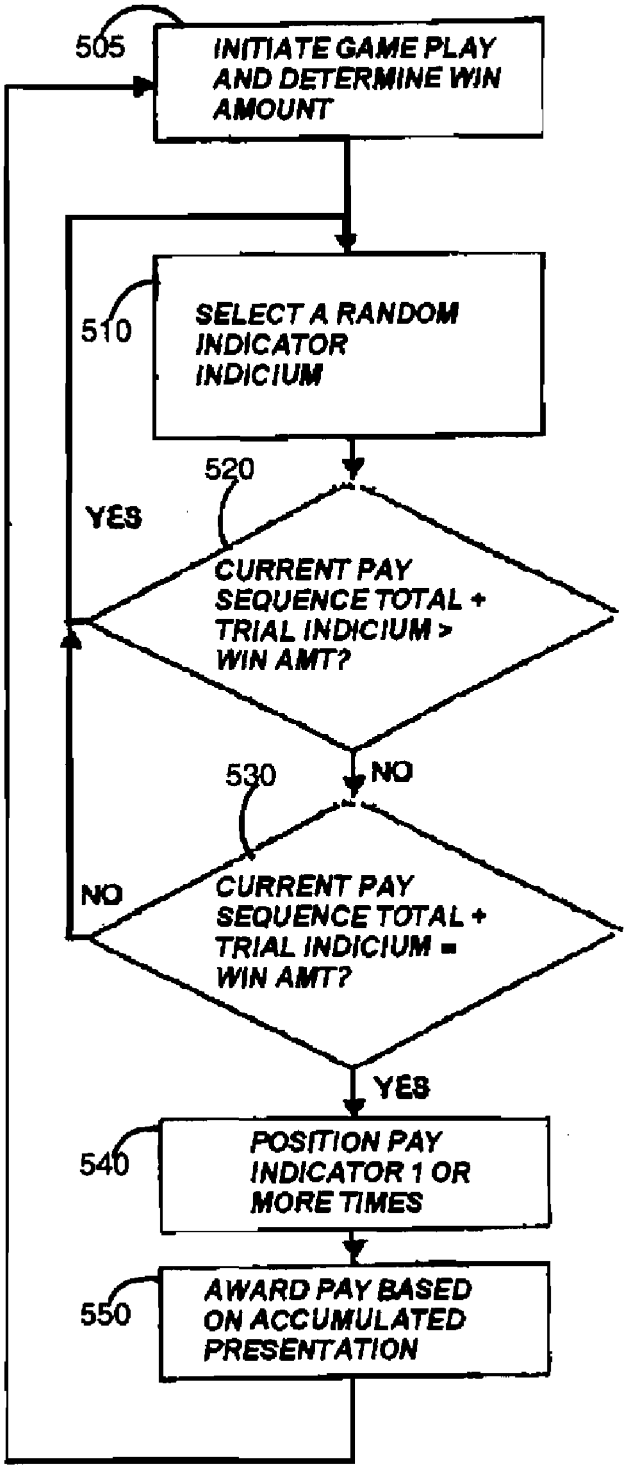
FIG. 5 is a functional block diagram illustrating a method for dynamically determining a mechanical primary game display presentation.

FIG. 5 is a flow diagram generally depicting the acts associated with carrying out an example of a mechanical primary game display (such as a pointer) sequence. The order of actions as shown in FIG. 5 and described below is merely provided for illustrative purposes, and is not intended to be limiting. The example algorithm uses a random trial-and-error to produce a valid presentation sequence by repeatedly selecting a presentation value, seeing if applying this value to the current presented total would exceed the actual win amount and, if not, including this presentation value in the display sequence until the actual win amount has been exactly reached.

First at block 505, the actual win amount is determined. For example, the player initiates play of the game by inserting currency of some form, selecting the quantity of a wager and presses a start a button or switch. The game may also be randomly selected for play as described above.

Next, at block 510, a random pay amount for the game outcome is selected using a random generator. Using the pay determined in block 510 as a target, the random generator is further used to select one of the available pay indicia on the primary game display indicator at block 520. If a relatively short display sequence is desired, a weighted table may be used to favor certain higher amounts, 100, for example, on the display.

A trial addition of the currently selected pay indicium is applied to the current presentation sequence total, i.e., the amount the current presentation sequence would display if presented immediately, at decision block 520 to see if the resulting new amount would exceed the actual win amount. For example, if a total pay presentation of 100 is required, the current presentation sequence total is 80 and the currently selected indicium is 200, the currently selected indicium would not be added to the display presentation sequence and processing would return to block 510 for selection of a new trial indicium. It should be noted that, as long as there is at least one indicium on the display face, a valid sequence will eventually be selected.

If the trial application of the selected pay indicium does not exceed the actual win amount, the indicium is added to the display sequence and processing continues to block 530, where it is determined whether the current sequence will display the actual win amount exactly. If so, the sequence is fully constructed and processing proceeds to block 540 otherwise, processing returns to block 510 for selection of another indicium.

At block 540, the display pointer is sequenced through one or more positions that progressively reveal the win amount to the player. Processing continues at block 550 where the accumulated pay amount that has been shown by the display is awarded to the player. Normal play resumes at block 505.

Figure 7:
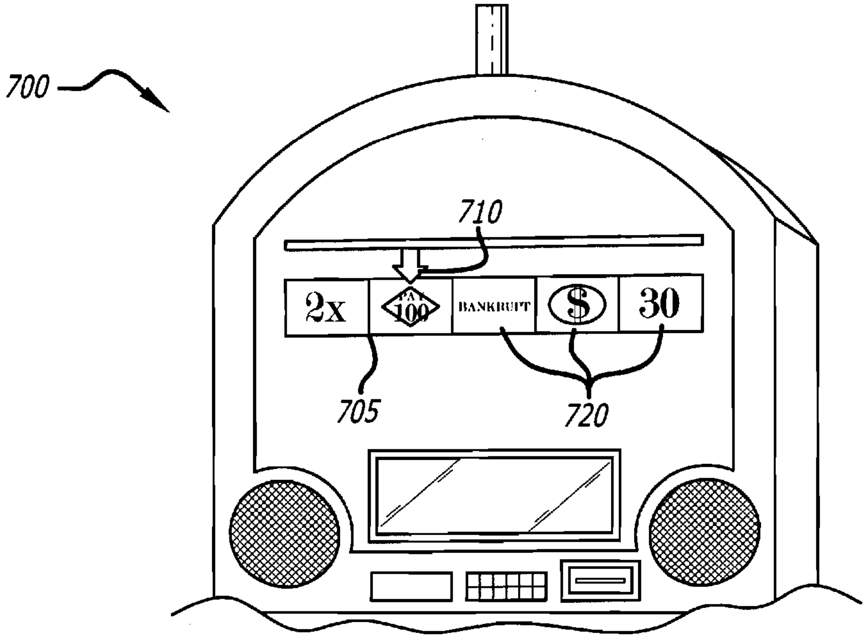
FIG. 7 illustrates an embodiment of a gaming machine having a primary game display using a linear moving pointer.
Figure 6:
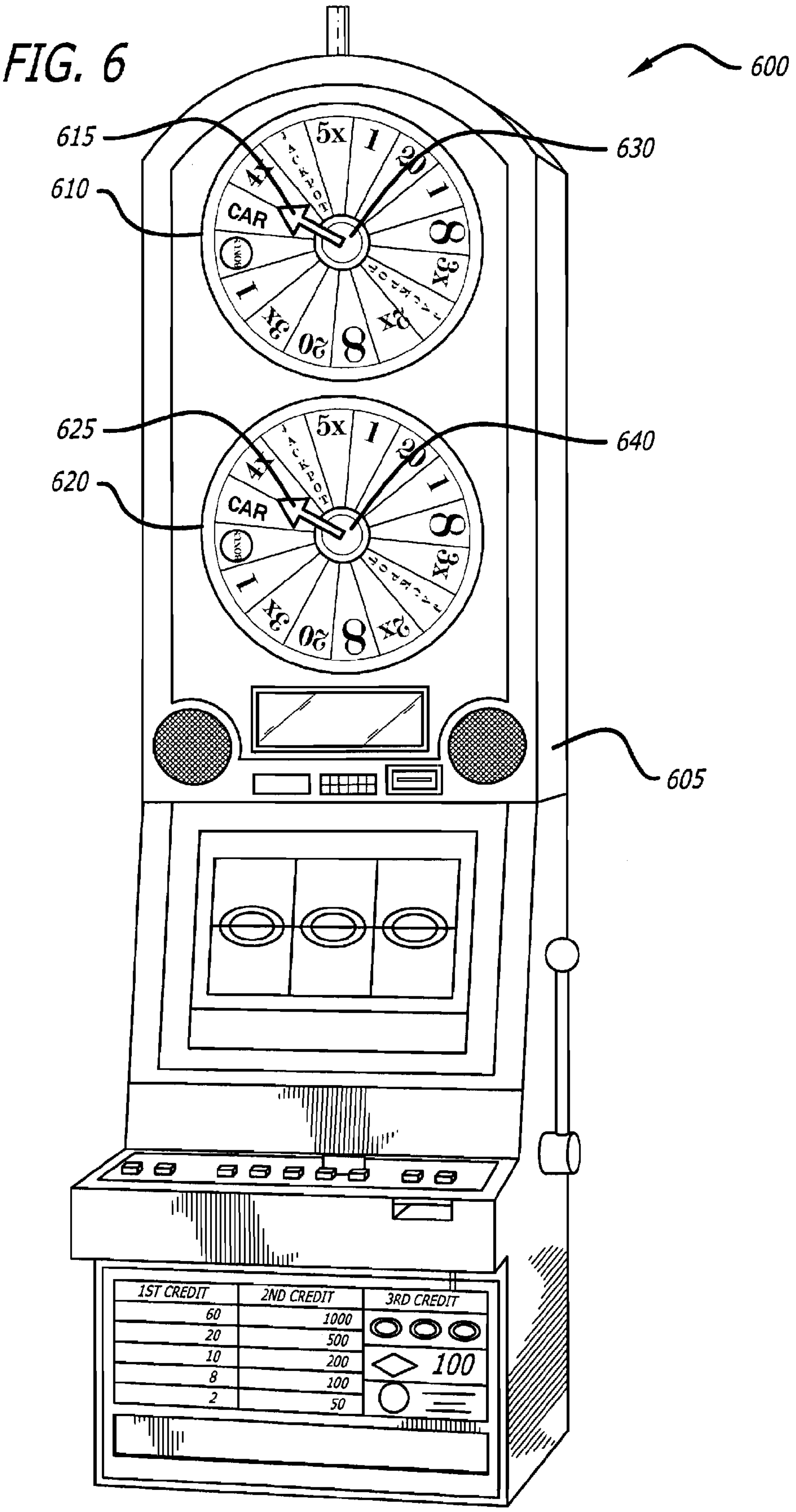
FIG. 6 illustrates an embodiment of a gaming machine having a mechanical primary game display with two wheel and pointer mechanisms.

In an optional embodiment, the gaming machine 10 offers at least three distinct primary games for play. Referring to FIG. 6, gaming machine 600 has two mechanical display indicators 610 and 620, which may be used in combination to represent a win value for a single primary game. For example, two pointers 615 and 625 on wheel faces 630 and 640 both indicate pays of 150 for a total pay of 300. A single one of these devices could be used to indicate multiple values sequentially (multiple spins) or simultaneously (using multiple pointers on one or more wheel faces). Displays could be viewed through multiple windows in front of one or more disks or the entire disk(s) may be visible. In other embodiments, the primary game display may take any shape or form such as, by way of example and without limitation, additional reels, a rotating wheel or disk, or a clock-like face. The wheel may take the form of a "light wheel" or "light bar" on which one or more illuminated lights indicate the position of a plurality of simulated pointers. In still further embodiments, the mechanical primary display may comprise a linear representation of a stationary pointer beside or beneath which pay indicia move or, as illustrated in FIG. 7, primary display indicator 700 may comprise a plurality of indicia 720 and one or more movable pointers 710 arranged to stop adjacent to and indicate any of the indicia. Alternately, video representations of these or similar primary game displays may be used.

Figure 8:
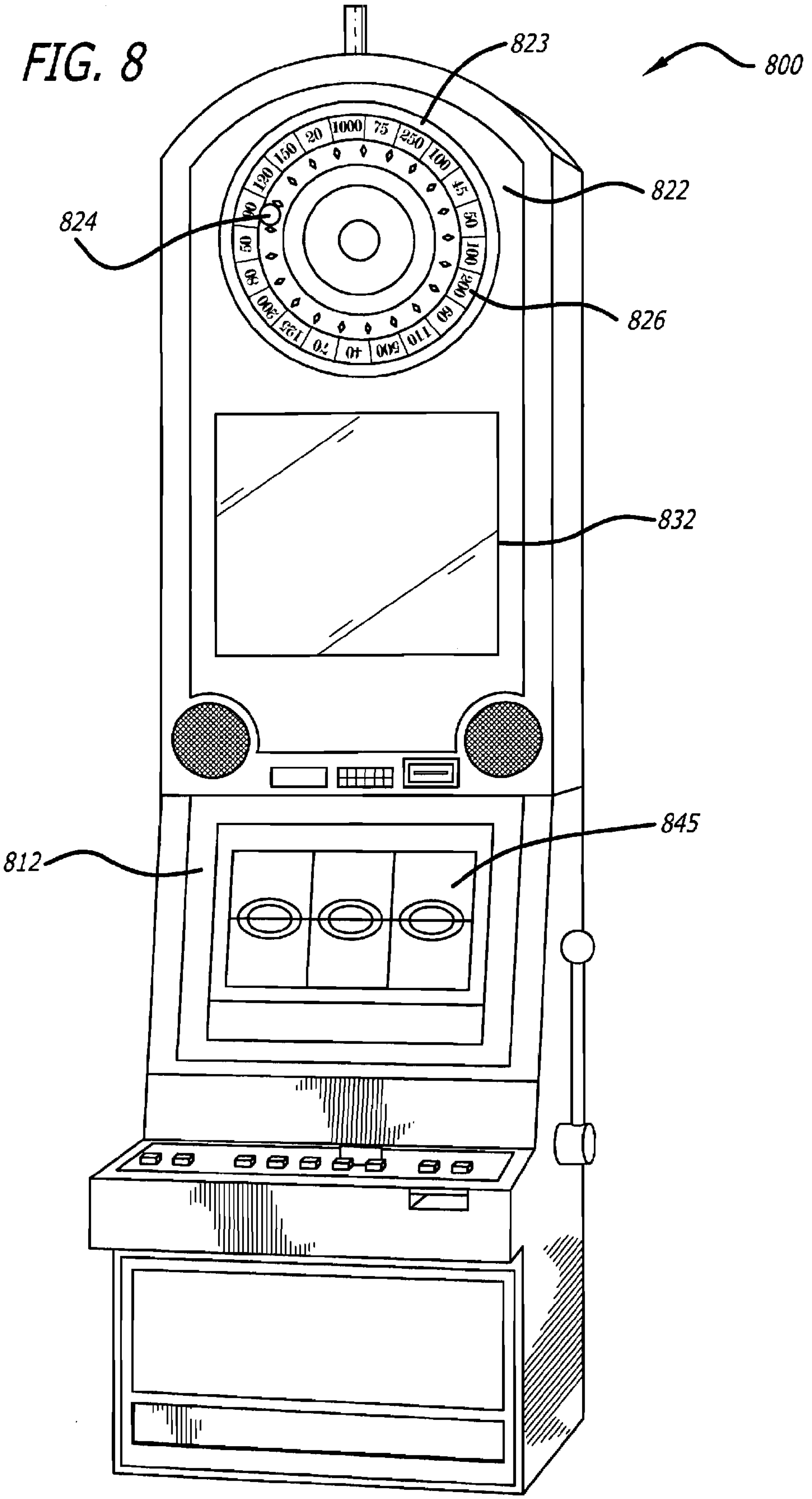
FIG. 8 illustrates an embodiment of a gaming machine comprising two or more primary games.

Optionally, in an alternate embodiment, the gaming machine offers at least three different types of primary games for play. Referring to FIG. 8, a gaming machine 800 offers a reel game, a wheel game and a video game. A reel game is presented in a first primary game display 812 and a roulette-style wheel game is presented in a second primary game display 822. Additionally, a video-type game of chance is presented in a third primary game display 832. The video game may include one or more games of chance such as, but not limited to, video slots, video poker, video blackjack, video keno, video representation of a wheel game or any other video representation of a game of chance. In alternate embodiments, the third primary game display 832 may present games of skill or game of chance involving some player skill.

Those skilled in the art will readily recognize that while two primary games have been illustrated that are randomly or systematically activated on gaming machine 10, gaming machine 10 may have three or more primary games that may be implemented to play selectively as discussed above through a random or systematic selection. Additionally, it may further be appreciated that each of the games could be operated on a remote host computer, such that gaming machine 10 operates the respective gaming and video displays in conjunction with the host computer game play; and, a player initiates play through the player interface with the host computer over a network. It may further be appreciated that while a wheel game has been illustrated and described, wheel 23 could be replaced by a square, circle, polygon, or other area representation in which the various payout indicators 26 of different shapes and sizes may be situated and identified or selected with a pointer or a light, that is randomly determined according to the software and/or hardware of gaming machine 10. As an example, a square game may include a large square surrounding a set of squares with payout values and a pointer light that sequentially or randomly lights each of the squares until a payout square is selected.

In another embodiment, a player can place bets in anticipation of the type of primary game that will be selected. For example, in a gaming machine offering two distinct primary games, the player may place two distinct wagers. More particular, the player may wager 3 credits for a first primary game and may wager 2 credits for the second primary game. Play of the game is activated by pressing start (or via some other activation means). Once the gaming machine receives the multiple wagers, the gaming machine then randomly selects a game to present to the player. If the gaming machine presents the first primary game, then the player's 3-credit wager is applied. Similarly, if second primary game is instead presented to the player, then the player's 2-credit wager is applied. As those skilled in the art will appreciate, any combination of wagers may be placed in this type of game scenario. Optionally, in an alternate embodiment, the game sacrifices one of the multiple wagers placed. For example, a player makes a 3-credit bet on the first primary game and a 2-credit bet on the second primary game. After the player presses start, the first primary game is randomly selected and is displayed on the first primary game display. The player's 3-credit bet is applied to the first primary game and the player's 2-credit bet (placed on the un-played second primary game) is sacrificed.

Optionally, in one embodiment, in a gaming machine 10 having at least two primary games, each game has its own math model. For example, in one embodiment a gaming machine has a first primary game and a separate, second primary game. More particularly, the first primary game has a math model separate from the second primary game. As a result, the player's entire wager is devoted to the primary game being played. Alternatively, in an optionally embodiment, only a portion of the player's wager is devoted to the primary game being played.

Additionally, in an optional embodiment, a gaming machine 10 may be used in a casino gaming system. In one embodiment, the gaming machine is operatively connected to a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on a gaming machine 10. These input components (not shown) include, but are not limited to, a slot for receiving a player tracking card, a keypad or equivalent, an electronic button receptor, a touch screen, or the like. The player tracking system may also include a database of all qualified players (i.e., those players who have enrolled in a player rating or point accruing program). Generally, the database for the player tracking system is separate from the gaming machine 10. In one embodiment, the insertion of a player tracking card, triggers the random selection process of one of the multiple primary games offered on the gaming machine 10.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine providing multiple, distinct primary games, the gaming machine comprising:

a first primary game presented on a first primary game display and a second primary game presented on a second primary game display;

a central processing unit for receiving a trigger from a player input means to activate game play, wherein the central processing unit is operatively associated with the first and second primary games for executing only one of the two primary games and preventing execution of all other games in response to receiving a wager until completion of game play; and a primary game selection controller for randomly selecting the first primary game or the second primary game for game play, wherein the primary game selection controller selects a primary game in response to player activation using a random number generator that is always weighted to statistically select the first primary game more often than the second primary game, wherein the player does not know which game will be played when game play is initiated, and wherein the gaming machine presents no options in which players may select a primary game.

2. The gaming machine of claim 1, wherein the player input means is mechanical buttons, electromechanical buttons, touch screen buttons, a touch screen system, touch pad, track ball, mouse, switches, toggle switches or any combination thereof.

3. The gaming machine of claim 1, wherein the primary game selection means is a random selection means.

4. The gaming machine of claim 3, wherein the random selection means is a random number generator.

5. The gaming machine of claim 1, wherein the first primary game is a mechanical reel game having at least one indicia-bearing reel.

6. The gaming machine of claim 1, wherein the second primary game is a wheel game having a wheel and a pointer.

7. The gaming machine of claim 6, wherein the pointer is rotatable at a gradually slowing rate.

8. The gaming machine of claim 6, wherein the wheel is rotatable at a gradually slowing rate.

9. The gaming machine of claim 6, wherein the second primary game includes multipliers.

10. The gaming machine of claim 1, wherein the random selection of the primary games is not evenly weighted.

11. The gaming machine of claim 1, wherein the random selection of the primary games is evenly weighted, on average.

12. The gaming machine of claim 1, further comprising a payout mechanism.

13. The gaming machine of claim 1, further comprising a currency acceptor.

14. The gaming machine of claim 1, wherein the trigger comprises receiving a player wager.

15. The gaming machine of claim 1, wherein the trigger comprises receiving a player tracking card.

16. The gaming machine of claim 1, further comprising one or more additional, distinct primary games and corresponding primary game displays.

17. The gaming machine of claim 1, further comprising a video display.

18. A method for playing a game on a gaming machine having at least two distinct primary games, the method comprising:

receiving a wager from a player;

selecting one of the at least two distinct primary games for game play, wherein a primary game selection controller selects a primary game in response to player activation using a random number generator that is weighted to statistically select a first primary game more often than a second primary game, wherein the player does not know which game will be played when game play is initiated, and wherein the gaming machine presents no options in which players may select a primary game;

activating the selected primary game using a central processing unit, wherein the central processing unit is operatively associated with the first and second primary games for executing only one of the two primary games and preventing execution of all other games in response to receiving a wager until completion of game play;

presenting a game outcome to the player for the activated game; and awarding a payout for a game outcome as appropriate.

19. The method of claim 18, further comprising evaluating the game outcome to determine a payout.

20. The method of claim 18, further comprising triggering the selection of a primary game.

21. The method of claim 18, wherein selecting one of the at least two distinct primary games further comprises randomly selecting one of the at least two distinct primary games.

22. The method of claim 18, wherein receiving the wager further comprises receiving a wager for a first primary game and receiving a wager for second primary game.

23. The method of claim 18, wherein after selecting one of the at least two distinct primary games, only the wager for the selected game is applied.

24. The method of claim 18, wherein the payout is based on the size of the wager.

25. The gaming machine of claim 1, wherein the selection controller comprises a central processing unit that executes a game program in conjunction with a random number generator.

26. The gaming machine of claim 1, wherein the random number generator is weighted to statistically select the second primary game only once in every thirty plays of the gaming machine.

* * * * *

UNITED STATES PATENT AND TRADEMARK OFFICE

CERTIFICATE OF CORRECTION

PATENT NO. : 7,857,698 B2
APPLICATION NO. : 11/428220
DATED : December 28, 2010
INVENTOR(S) : Marvin A. Hein et al.

It is certified that error appears in the above-identified patent and that said Letters Patent is hereby corrected as shown below:

Column 6
Line 8, replace “award” with --awarded--

Column 8
Line 49, delete “a” before --button--

Column 10
Line 25, insert --a-- after “if”

Column 10
Line 45, replace “optionally” with --optional--

Signed and Sealed this
Eighth Day of March, 2011

David J. Kappos
*Director of the United States Patent and Trademark Office*